(12) United States Patent
Sanger et al.

(10) Patent No.: US 8,302,876 B2
(45) Date of Patent: Nov. 6, 2012

(54) VEHICLE SUPPLEMENTAL HEATING SYSTEM

(75) Inventors: Jeremy J. Sanger, White Lake, MI (US); Franco Garavoglia, Commerce Township, MI (US)

(73) Assignee: Ventech, LLC, Wixom, MI (US)

(*) Notice: Subject to any disclaimer, the term of this patent is extended or adjusted under 35 U.S.C. 154(b) by 1996 days.

(21) Appl. No.: 11/068,285

(22) Filed: Feb. 28, 2005

(65) Prior Publication Data

US 2005/0205682 A1 Sep. 22, 2005

Related U.S. Application Data

(60) Provisional application No. 60/547,814, filed on Feb. 26, 2004.

(51) Int. Cl.
*F24J 3/00* (2006.01)
*B60H 1/02* (2006.01)
*B60H 1/22* (2006.01)

(52) U.S. Cl. .......... 237/12.3 R; 237/8 A; 237/8 R; 237/12.3 B; 237/34; 126/247; 126/344; 122/3; 122/11; 122/26; 123/142.5 R; 165/156; 415/1; 415/55.1

(58) Field of Classification Search .......... 126/247, 126/344; 122/3, 11, 26; 123/41.44, 142.5 R; 165/165; 237/8 A, 8 R, 12.3 B, 12.3 R, 19, 237/34; 415/1, 55.1; B60H 1/02, 1/03, 1/04, B60H 1/22; F24J 3/00
See application file for complete search history.

(56) References Cited

U.S. PATENT DOCUMENTS 1,760,402 A 5/1930 Derrick
(Continued)

FOREIGN PATENT DOCUMENTS

DE 12 13 270 B 3/1966
(Continued)

OTHER PUBLICATIONS

Supplementary European Search Report for EP05724145 dated Oct. 30, 2009.
(Continued)

*Primary Examiner* — Steven B McAllister
*Assistant Examiner* — Daniel E Namay
(74) *Attorney, Agent, or Firm* — Young, Basile, Hanlon & MacFarlane, P.C.; Daniel J. Chackowsky

(57) ABSTRACT

A preferred embodiment supplemental heating system is fluidly connectable to a vehicle cooling system and includes a liquid heat generator operable for heating a cooling fluid delivered to the supplemental heating system from the vehicle's cooling system. The liquid heat generator includes a discharge passage connectable to a heater core of the vehicle and a inlet passage connectable to the vehicle's cooling system. The supplemental heating system further includes a control valve having an inlet connectable to an exit passage of a heater core of the vehicle, a discharge passage fluidly connected to the liquid heat generator, and a second discharge passage connectable to the vehicle's cooling system. The control valve is operable for controlling the proportion of cooling fluid exiting the heater core that is returned to the vehicle's cooling system and recirculated back to the liquid heat generator.

43 Claims, 6 Drawing Sheets

U.S. PATENT DOCUMENTS

| | | | |
|---|---|---|---|
| 1,915,547 A | 6/1933 | North et al. | |
| 2,428,005 A | 9/1947 | Bennett | |
| 2,496,497 A | 2/1950 | Russell | |
| 2,541,227 A | 2/1951 | Findley | |
| 2,542,390 A | 2/1951 | Brown | |
| 2,570,768 A | 10/1951 | Clerk | |
| 2,672,954 A | 3/1954 | Bennett | |
| 2,748,762 A | 6/1956 | Booth | |
| 2,748,899 A | 6/1956 | Booth et al. | |
| 2,749,049 A | 6/1956 | Smith | |
| 2,750,009 A | 6/1956 | Pohl | |
| 2,827,989 A | 3/1958 | Christenson | |
| 2,889,013 A | 6/1959 | Schneider | |
| 2,990,919 A | 7/1961 | Christenson et al. | |
| 3,024,876 A | 3/1962 | Montgomery | |
| 3,051,273 A | 8/1962 | Cordiano et al. | |
| 3,122,319 A | 2/1964 | Friedel et al. | |
| 3,136,392 A | 6/1964 | Rodway | |
| 3,139,158 A | 6/1964 | Sieving | |
| 3,146,863 A | 9/1964 | Herbenar et al. | |
| 3,164,961 A | 1/1965 | Schröder | |
| 3,178,889 A | 4/1965 | Nelden | |
| 3,265,162 A | 8/1966 | Botterill | |
| 3,270,838 A | 9/1966 | Schweizer | |
| 3,330,386 A | 7/1967 | Bertram et al. | |
| 3,405,524 A | 10/1968 | Nelden | |
| 3,451,511 A | 6/1969 | Knapp | |
| 3,461,913 A | 8/1969 | Scott | |
| 3,467,225 A | 9/1969 | Steffen et al. | |
| 3,512,616 A | 5/1970 | Bessiere | |
| 3,591,079 A | 7/1971 | Peters | |
| 3,601,211 A | 8/1971 | Finke | |
| 3,650,358 A | 3/1972 | Bessiere | |
| 3,684,335 A | 8/1972 | Franke et al. | |
| 3,701,599 A | 10/1972 | Stewart | |
| 3,707,168 A | 12/1972 | Boelkins | |
| 3,720,372 A | 3/1973 | Jacobs | |
| 3,756,028 A | 9/1973 | Bopp et al. | |
| 3,774,734 A | 11/1973 | Forster et al. | |
| 3,774,735 A | 11/1973 | Hanke et al. | |
| 3,860,097 A | 1/1975 | Braschler et al. | |
| 3,888,335 A | 6/1975 | Hanke | |
| 3,919,844 A | 11/1975 | Elderton | |
| 3,924,713 A | 12/1975 | Bessiere | |
| 3,941,224 A | 3/1976 | Hanke | |
| 3,952,508 A | 4/1976 | Bopp | |
| 3,955,597 A | 5/1976 | Oneyama et al. | |
| 3,989,127 A | 11/1976 | Staudenmaier et al. | |
| 4,004,660 A | 1/1977 | Shore et al. | |
| 4,043,434 A | 8/1977 | Braschler | |
| 4,061,214 A | 12/1977 | Ternehall | |
| 4,073,139 A | 2/1978 | Armasow et al. | |
| 4,175,647 A | 11/1979 | Hanke | |
| 4,187,884 A | 2/1980 | Loveless | |
| 4,201,050 A | 5/1980 | Nixel | |
| 4,257,504 A | 3/1981 | Hanke | |
| 4,276,970 A | 7/1981 | Herrmann et al. | |
| 4,285,329 A | 8/1981 | Moline | |
| 4,373,666 A | 2/1983 | Williams | |
| 4,386,735 A | 6/1983 | Tholen | |
| 4,396,007 A * | 8/1983 | Siemiller | 126/584 |
| 4,405,038 A | 9/1983 | Ternehäll | |
| 4,407,449 A | 10/1983 | Moser et al. | |
| 4,411,340 A | 10/1983 | Brosius et al. | |
| 4,430,966 A | 2/1984 | Marandet et al. | |
| 4,432,442 A | 2/1984 | Vogelsang | |
| 4,440,272 A | 4/1984 | Bieber | |
| 4,454,935 A | 6/1984 | Pryor | |
| 4,458,792 A | 7/1984 | Thomas et al. | |
| 4,474,270 A | 10/1984 | Vogelsang | |
| 4,483,325 A * | 11/1984 | Siemiller | 126/652 |
| 4,493,293 A | 1/1985 | Paul et al. | |
| 4,538,553 A | 9/1985 | Kurz et al. | |
| 4,597,481 A | 7/1986 | Müller et al. | |
| 4,664,068 A * | 5/1987 | Kretchmar et al. | 122/26 |
| 4,671,061 A | 6/1987 | Elderton | |
| 4,699,022 A | 10/1987 | Stadt et al. | |
| 4,733,635 A | 3/1988 | Menard et al. | |
| 4,773,513 A | 9/1988 | Herrmann et al. | |
| 4,836,341 A | 6/1989 | Hall, III | |
| 4,892,248 A | 1/1990 | Robin et al. | |
| 4,922,872 A | 5/1990 | Nogami et al. | |
| 4,938,323 A | 7/1990 | Höller et al. | |
| 4,974,778 A | 12/1990 | Bertling | |
| 4,993,377 A | 2/1991 | Itakura | |
| 5,048,752 A | 9/1991 | Hinetnnach et al. | |
| 5,090,523 A | 2/1992 | Vogelsang | |
| 5,174,334 A | 12/1992 | Nogle | |
| 5,184,643 A | 2/1993 | Raymond | |
| 5,193,654 A | 3/1993 | Vogelsang | |
| 5,253,806 A * | 10/1993 | Gaysert et al. | 237/12.3 C |
| 5,286,939 A * | 2/1994 | Martin | 219/718 |
| 5,333,707 A | 8/1994 | Kaneda | |
| 5,335,982 A | 8/1994 | Ando et al. | |
| 5,397,175 A | 3/1995 | Matsunaga et al. | |
| 5,407,130 A * | 4/1995 | Uyeki et al. | 237/12.3 B |
| 5,414,331 A * | 5/1995 | Izawa et al. | 318/400.38 |
| 5,472,268 A | 12/1995 | Ando et al. | |
| 5,564,627 A * | 10/1996 | Veitenhansl | 237/12.3 B |
| 5,657,723 A | 8/1997 | Edelmann et al. | |
| 5,657,838 A | 8/1997 | Vogelsang et al. | |
| 5,683,031 A | 11/1997 | Sanger | |
| 5,752,499 A | 5/1998 | Mori et al. | |
| 5,775,583 A | 7/1998 | Braatz | |
| 5,779,008 A | 7/1998 | Vogelsang et al. | |
| 5,788,151 A | 8/1998 | Moroi et al. | |
| 5,794,588 A | 8/1998 | Vogelsang et al. | |
| 5,819,697 A | 10/1998 | Edelmann et al. | |
| 5,829,562 A | 11/1998 | Adams et al. | |
| 5,829,675 A * | 11/1998 | Ban | 237/12.3 R |
| 5,845,608 A | 12/1998 | Ban et al. | |
| 5,873,342 A | 2/1999 | Friedrich et al. | |
| 5,878,951 A | 3/1999 | Moroi et al. | |
| 5,906,177 A | 5/1999 | Okabe et al. | |
| 5,934,097 A | 8/1999 | Karl | |
| 5,934,430 A * | 8/1999 | Kolomeitsev et al. | 192/84.6 |
| 5,954,266 A * | 9/1999 | Hoshino et al. | 237/12.3 R |
| 6,058,928 A | 5/2000 | Sitko et al. | |
| 6,082,316 A | 7/2000 | Ban et al. | |
| 6,116,514 A | 9/2000 | Moroi et al. | |
| 6,138,920 A * | 10/2000 | Ban et al. | 237/12.3 R |
| 6,167,993 B1 | 1/2001 | Adams et al. | |
| 6,234,285 B1 | 5/2001 | Friedrich et al. | |
| 6,308,896 B1 * | 10/2001 | Moroi et al. | 237/12.3 R |
| 6,371,381 B1 * | 4/2002 | Niwa et al. | 237/12.3 R |
| 6,412,884 B1 | 7/2002 | Takayama et al. | |
| 6,558,112 B2 | 5/2003 | Moroi et al. | |
| 6,561,324 B2 | 5/2003 | Friedrich et al. | |
| 6,616,059 B2 | 9/2003 | Sabhapathy et al. | |
| 6,695,415 B2 | 2/2004 | Stephan | |
| 6,811,374 B2 | 11/2004 | Brisson et al. | |
| 6,811,375 B2 | 11/2004 | Brisson et al. | |
| 6,883,474 B2 | 4/2005 | Bucknor | |
| 6,896,191 B2 | 5/2005 | Augenstein et al. | |
| 6,957,695 B2 | 10/2005 | Lomax, Jr. et al. | |
| 7,063,137 B2 | 6/2006 | Kadle et al. | |
| 7,069,728 B2 | 7/2006 | Bruno et al. | |
| 7,318,553 B2 | 1/2008 | Thoma | |
| 7,387,262 B2 | 6/2008 | Thoma | |
| 7,647,896 B2 * | 1/2010 | Isopo | 122/26 |
| 7,793,856 B2 | 9/2010 | Hernandez et al. | |
| 2001/0018832 A1 | 9/2001 | Matsunaga | |
| 2002/0005181 A1 | 1/2002 | Moroi et al. | |
| 2008/0060375 A1 | 3/2008 | Sanger et al. | |

FOREIGN PATENT DOCUMENTS

| | | |
|---|---|---|
| DE | 1476425 | 4/1970 |
| DE | 19730678 | 4/1970 |
| DE | 2135268 | 1/1973 |
| DE | 3147468 | 12/1982 |
| DE | 3241835 | 2/1984 |
| DE | 3301560 | 4/1984 |
| DE | 3828470 | 3/1990 |
| DE | 4415031 | 5/1995 |
| DE | 3713580 | 11/1998 |
| DE | 19744529 | 2/1999 |
| DE | 19847607 | 4/2000 |

| | | | |
|---|---|---|---|
| DE | 198 50 064 A1 | | 5/2000 |
| DE | 19901807 | | 7/2000 |
| DE | 10028280 | | 4/2001 |
| DE | 10136888 | | 2/2003 |
| DE | 10144845 | | 3/2003 |
| EP | 0826530 | | 3/1998 |
| EP | 0796752 | | 11/2001 |
| EP | 0842800 | | 2/2003 |
| FR | 2263903 | | 10/1979 |
| GB | 2134245 | | 8/1984 |
| JP | 58165545 A | * | 9/1983 |
| JP | 61093340 A | | 5/1986 |
| JP | 02246823 A | * | 10/1990 |
| JP | 02254010 A | | 10/1990 |
| JP | 9315133 | | 12/1997 |
| JP | 10006758 A | | 1/1998 |
| JP | 1044749 | | 2/1998 |
| JP | 10044749 | | 2/1998 |
| JP | 10 297265 A | | 11/1998 |
| JP | 2000211343 A | | 8/2000 |
| JP | 2000225830 A | | 8/2000 |
| JP | 2000329086 A | | 11/2000 |
| JP | 2001333557 A | | 11/2001 |
| JP | 2002031075 A | | 1/2002 |
| JP | 2002181381 A | | 6/2002 |
| JP | 2007505284 T | | 3/2007 |
| KR | 100478217 | | 3/2005 |
| WO | WO/02081979 A1 | | 10/2002 |
| WO | WO 2008010780 A1 | * | 1/2008 |
| WO | WO-2008 058376 A1 | | 5/2008 |
| WO | WO 2010128752 A1 | * | 11/2010 |

OTHER PUBLICATIONS

PCT International Search Report for PCT/US08/50398 dated Sep. 10, 2008.
Response to Non-Final Office Action dated Mar. 7, 2011 for U.S. Appl. No. 11/620,682.
English Language Abstract for JP 61093340, (Jul. 14, 2009).
English Language Abstract for JP 2002181381, (Jul. 14, 2009).
English Language Abstract for JP 2002031075, (Jul. 14, 2009).
Russian Official Action (with translation) dated Feb. 27, 2009.
International Preliminary Report on Patentability dated Mar. 27, 2006 for International Application No. PCT/US05/06545.
11620682—2011-02-26-JP-2000225830—A.M. Trans..pdf;
Machine Translation of JP Patent #2000-225830 A, (Apr. 26, 2011).
Non-Final Office Action dated Feb. 22, 2011 for U.S. Appl. No. 12/098,061.
Non-Final Office Action dated Mar. 7, 2011 for U.S. Appl. No. 11/620,682.
PCT International Search Reported dated Mar. 8, 2010 for PCT/US2009/052113.
Response to Non-Final Office Action dated Feb. 22, 2011 for U.S. Appl. No. 12/098,061.
Supplementary European Search Report dated May 6, 2011 for EP08754821.
Notice of Allowance dated Jul. 11, 2011 for U.S. Appl. No. 12/141,592.

* cited by examiner

VEHICLE SUPPLEMENTAL HEATING SYSTEM

RELATED APPLICATIONS

This application is a continuation of U.S. Provisional Application Ser. No. 60/547,814 filed Feb. 26, 2004.

FIELD OF THE INVENTION

The present invention relates in general to heat generators, and more particularly, to a supplemental liquid heating system for providing supplemental heat to a passenger compartment of an automotive vehicle.

BACKGROUND OF THE INVENTION

Conventional automotive vehicles typically include a heating system for supplying warm air to a passenger compartment of the vehicle. The heating system includes a control system that allows a vehicle operator to regulate the quantity and/or temperature of air delivered to the passenger compartment so as to achieve a desirable air temperature within the passenger compartment. Cooling fluid from the vehicle's engine cooling system is commonly used as a source of heat for heating the air delivered to the passenger compartment.

The heating system typically includes a heat exchanger fluidly connected to the vehicle's engine cooling system. Warm cooling fluid from the engine cooling system passes through the heat exchanger and gives up heat to a cool air supply flowing through the heating system. The heat energy transferred from the warm cooling fluid to the cool air supply causes the temperature of the air to rise. The heated air is discharged into the passenger compartment to warm the interior of the vehicle to a desired air temperature.

The vehicle's engine cooling system provides a convenient source of heat for heating the vehicle's passenger compartment. One disadvantage of using the engine cooling fluid as a heat source, however, is that there is typically a significant delay between when the vehicle's engine is first started and when the heating system begins supplying air at a preferred temperature. This is particularly true when the vehicle is operated in very cold ambient conditions or has sat idle for a period of time. The delay is due to the cooling fluid being at substantially the same temperature as the air flowing through the heating system and into the passenger compartment when the engine is first started. As the engine continues to operate, a portion of the heat generated as a byproduct of combusting a mixture of fuel and air in the engine cylinders is transferred to the cooling fluid, causing the temperature of the cooling fluid to rise. Since, the temperature of the air being discharged from the heating system is a function of the temperature of the cooling fluid passing through the heat exchanger, the heating system will produce proportionally less heat while the engine cooling fluid is warming up than when the cooling fluid is at a preferred operating temperature. Thus, there may be an extended period of time between when the vehicle's engine is first started and when the heating system begins producing air at an acceptable temperature level. The time it takes for this to occur will vary depending on various factors, including the initial temperature of the cooling fluid and the initial temperature of the air being heated. It is preferable that the temperature of the cooling fluid reach its preferred operating temperature as quickly as possible.

Another potential limitation of using the engine cooling fluid as a heat source for the vehicle's heating system is that under certain operating conditions the engine may not be rejecting enough heat to the cooling fluid to enable the air stream from the vehicle's heating system to achieve a desired temperature. This may occur, for example, when operating a vehicle with a very efficient engine under a low load condition or in conditions where the outside ambient temperature is unusually cold. Both of these conditions reduce the amount of heat that needs to be transferred from the engine to the cooling fluid to maintain a desired engine operating temperature. This results in less heat energy available for heating the air flowing through the vehicle's heating system.

Accordingly it is desirable to develop a supplemental heating system capable of intermittently providing additional heating of an engine's cooling fluid so as to improve the heating efficiency of the vehicles's passenger compartment heating system.

BRIEF DESCRIPTION OF THE DRAWINGS

The present invention will become more fully understood from the detailed description and accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
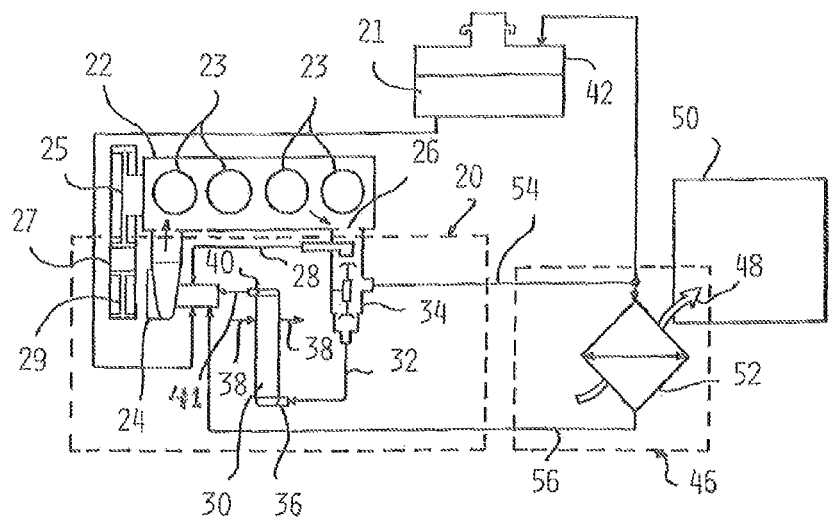
FIG. 1 is a schematic depiction of a conventional engine cooling and passenger compartment heating system.

Referring to FIG. 1, a schematic of a conventional vehicle cooling system 20 for regulating the operating temperature of an engine 22 is shown. Cooling system 20 includes a water pump 24 that is operable to circulate a cooling fluid 21 through engine 22 to absorb excess heat produced by engine 22. The excess heat is a byproduct of combusting a mixture of fuel and air in cylinders 23 of engine 22 to produce usable mechanical work for propelling the vehicle. Water pump 24 may be powered by an engine accessory drive 25 by means of drive belt 27 that engages a sheave 29 of water pump 24. Accessory drive 25 is typically connected to a crankshaft (not shown) of engine 22. The cooling fluid is circulated through passages (not shown) in the engine where the fluid absorbs some of the excess heat. After circulating through the engine, the cooling fluid is discharged from engine 22 through a passageway 26. Depending on the temperature of the cooling fluid exiting the engine, the cooling fluid is either directed back to water pump 24 through a bypass line 28 to be recirculated through engine 22, or to a radiator 30 through a fluid line 32.

A thermostat 34 controls the distribution of cooling fluid 21 between bypass line 28 and fluid line 32. Thermostat 34 may be a thermally activated valve capable of automatically adjusting its thru-flow area depending on the temperature of cooling fluid 21 discharged from engine 22 through exit passage 26. Automotive type thermostats can be calibrated to begin opening at a predetermined cooling fluid temperature (measured within thermostat 34), for example 190° Fahrenheit. At cooling fluid temperatures below the calibrated temperature, thermostat 34 may be fully closed to prevent cooling fluid from being supplied to radiator 30 through line 32. At temperatures at or slightly above the calibrated temperature, thermostat 34 begins opening to allow a portion of cooling fluid 21 from engine 22 to be directed to radiator 30. At cooling fluid temperatures significantly higher than the calibrated temperature, thermostat 34 will be completely open so as to maximize the flow rate of cooling fluid 21 to radiator 30 for a particular vehicle operating condition.

Cooling fluid 21 passing through fluid line 32 enters radiator 30 through an inlet port 36. Cooling fluid 21 flows through radiator 30 where the fluid rejects a portion of its heat to a stream of ambient air 38 flowing across the radiator. Cooling fluid 21 exits radiator 30 through an outlet port 40 at a lower temperature than the temperature of the cooling fluid entering radiator 30 at inlet port 36. Upon exiting radiator 30 at exit port 40, cooling fluid 21 is directed to water pump 24 through a fluid line 41.

An expansion tank 42 is fluidly connected to water pump 24. Expansion tank 42 provides a reservoir for capturing cooling fluid 21 discharged from cooling system 20 as the cooling fluid is heated, such as may occur when engine 22 is started after being turned off for a period of time. A portion of the excess cooling fluid 21 may also be withdrawn from expansion tank 42 and returned back to cooling system 20 when the temperature of the cooling fluid within cooling system 20 is decreased, such as may occur after engine 22 is turned off.

Conventional automotive vehicles may include a heating system 46 for providing a supply of warm air to heat a passenger compartment 50 of the vehicle. Heating system 46 includes a heat exchanger 52, also known as a heater core, fluidly connected to cooling system 20 through an inlet heater hose 54 and exit heater hose 56. Inlet heater hose 54 may be connected to cooling system 20 at thermostat 34. A portion of cooling fluid 21 exiting engine 22 at port 26 passes through heater hose 54 to heater core 52. Cooling fluid 21 rejects a portion of its heat to a stream of air 48 made to flow over heater core 52. Airstream 48 may include air drawn from outside the vehicle, from a passenger compartment 50 of the vehicle, or a combination thereof. Airstream 48 exits heater core 52 at a higher temperature than when it entered. The warm airstream 48 may be discharged into passenger compartment 50 to warm the interior of the vehicle. Warm airstream 48 may also be directed to flow over an interior glass surface (not shown) of the vehicle to remove frost or condensation that may have formed on the glass surface. Heating system 46 may also include various control devices (not shown) for regulating a temperature and flow rate of airstream 48 being supplied to passenger compartment 50.

Figure 2:
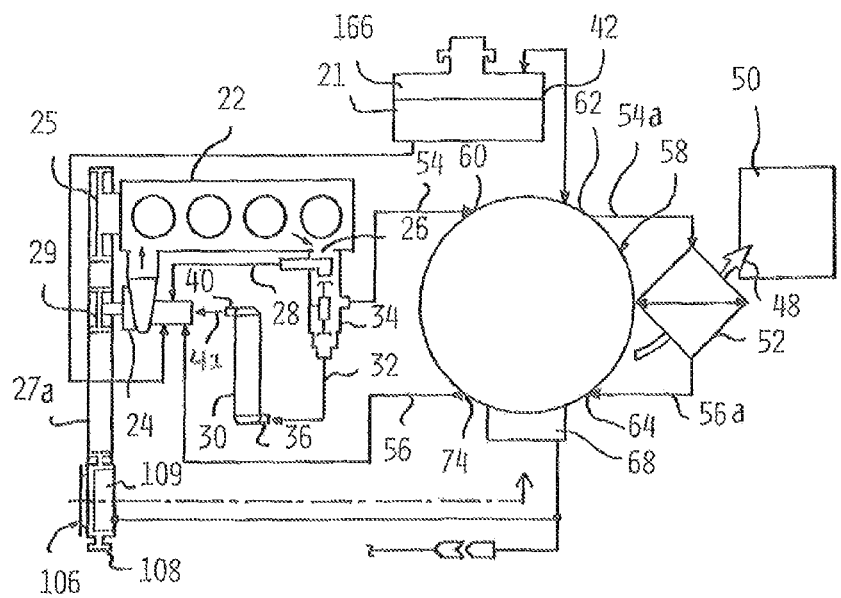
FIG. 2 is schematic depiction of a preferred embodiment a vehicle supplemental heating system of the present invention integrated with the engine cooling and heating systems shown in FIG. 1.

Referring to FIG. 2, a supplemental heating system (SHS) 58 of the present invention is schematically shown fluidly connected between cooling system 20 and heating system 46. Supplemental heating system 58 is operable to control the distribution of cooling fluid 21 between cooling system 20 and heating system 46, as well as providing additional heat, if necessary, to that portion of cooling fluid 21 supplied to heater core 52.

Supplemental heating system 58 can be fluidly connected to cooling system 20 by means of inlet heater hose 54 and exit heater hose 56. Cooling fluid 21 from cooling system 20 may be delivered to supplemental heating system 58 through inlet heater hose 54 connected to supplemental heating system 58 at a port 60. Cooling fluid 21 may be returned to cooling system 20 through exit heater hose 56 connected to supplemental heating system 58 at a port 74.

Supplemental heating system 58 may be fluidly connected to heater core 52 by a inlet heater hose 54a and exit heater hose 56a. Cooling fluid 21 circulating within supplemental heating system 58 may exit supplemental heating system 58 at a port 62 and travel through inlet heater hose 54a to heater core 52, wherein a portion of the heat from cooling fluid 21 may be transferred to airstream 48. Upon exiting heater core 52, cooling fluid 21 is directed back to supplemental heating system 58 through exit heater hose 56a, where it reenters supplemental heating system 58 at a port 64.

Figure 3:
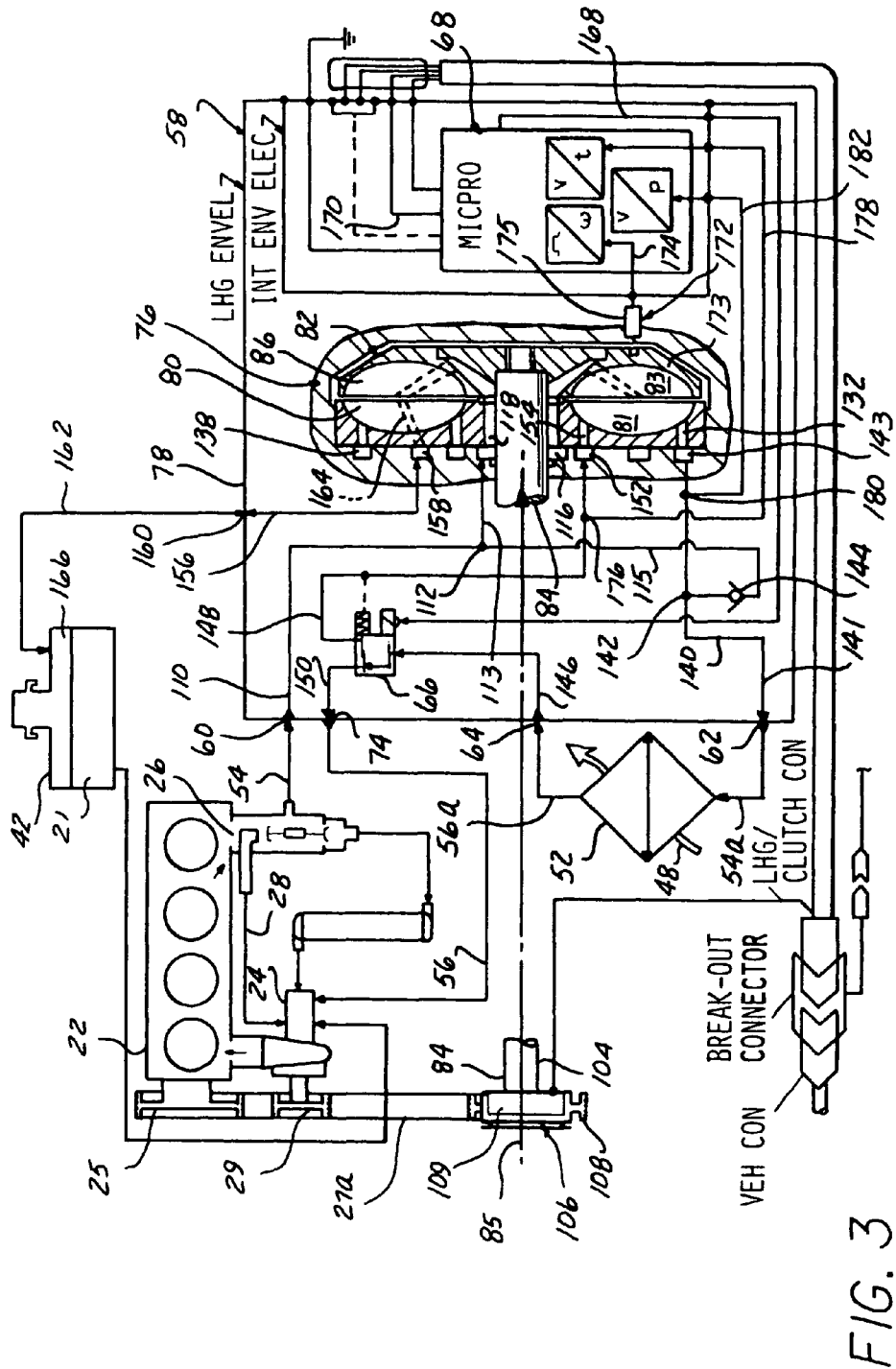
FIG. 3 is a more detailed depiction of the preferred embodiment supplemental heating system shown in FIG. 2.

Referring to FIG. 3, supplemental heating system 58 is shown to include a liquid heat generator (LHG) 76 for providing supplemental heating of at least a portion of cooling fluid 21 being supplied to heater core 52. An example of one such liquid heat generator is disclosed in U.S. Pat. No. 5,683,031, entitled Liquid Heat Generator, which issued to Sanger on Nov. 4, 1997. The U.S. Pat. No. 5,683,031 is incorporated herein by reference. Supplemental heating system 58 may also include a control valve 66 for controlling distribution of cooling fluid 21 within supplemental heating system 58, and a control device 68 for regulating operation of liquid heat generator 76 and control valve 66.

Supplemental heating system 58 can be supplied with cooling fluid 21 from cooling system 20 through heater hose 54 attached to port 60 of supplemental heating system 58. Cooling fluid 21 entering supplemental heating system 58 at port 60 travels through a coolant supply passage 110 to a fluid junction 112. At fluid junction 112, all or a portion of cooling fluid 21 may travel through a LHG supply passage 113 fluidly connecting coolant supply passage 110 to liquid heat generator 76, or through a LHG bypass passage 115 bypassing liquid heat generator 76. Cooling fluid 21 traveling along LHG bypass passage 115 passes through a check valve 144 and is discharged into a LHG discharge passage 140 at fluid junction 142. Check valve 144 is preferably configured to allow fluid to flow through the valve in only one direction, which is in a direction from fluid junction 112 to fluid junction 142.

LHG discharge passage 140 has one end 143 fluidly connected to liquid heat generator 76 and a second end 141 fluidly connected to exit port 62 of supplemental heating system 58. Cooling fluid 21 entering LHG discharge passage 140 from LHG bypass passage 115 flows toward exit port 62 and away from liquid heat generator 76. Cooling fluid 21 can be discharged from supplemental heating system 58 into heater hose 54a attached to supplemental heating system 58 at port 62. Cooling fluid 21 flows through inlet heater hose 54a to heat exchanger 52 where heat from the cooling fluid can be transferred to airstream 48. Upon being discharged from heat exchanger 52, cooling fluid 21 is returned to supplemental heating system 58 through exit heater hose 56a attached to supplemental heating system 58 at port 64. Cooling fluid 21 entering port 64 passes through a heat exchanger return passage 146 having one end fluidly connected to control valve 66 and another end to port 64.

Control valve 66 is operable to control distribution of cooling fluid 21 between a coolant return passage 150 fluidly connected to exit heater hose 56 at port 74, and a coolant recirculating passage 148 fluidly connected to liquid heat generator 76. Cooling fluid 21 directed by control valve 66 to coolant return passage 150 is returned to pump 24, while cooling fluid passing through coolant recirculating passage 148 is delivered to liquid heat generator 76. Preferably, control valve 66 is operable to enable cooling fluid 21 received by control valve 66 to be selectively divided between coolant return passage 150 and coolant recirculating passage 148 based on certain preselected parameters. This may include directing all the cooling fluid entering control valve 66 from heat exchanger return passage 146 to either coolant return passage 150 or coolant recirculating passage 148, or dividing the cooling fluid between the two passages. Control valve 66 is preferably infinitely adjustable.

Liquid heat generator 76 includes a stator 80 and a coaxially aligned rotor 82 positioned adjacent stator 80. Stator 80 is fixedly attached to a housing 78 while rotor 82 is mounted on a drive shaft 84 for concurrent rotation therewith about an axis 85 relative to stator 80 and housing 78. Stator 80 and rotor 82 each include an annular cavity 81 and 83, respectively, which together define a hydrodynamic chamber 86.

Cooling fluid 21 can be supplied to liquid heat generator 76 through LHG supply passage 113 connected to coolant supply passage 110 at fluid junction 112. Cooling fluid 21 can be discharged into a plenum 116. Cooling fluid 21 flows from plenum 116 into a passage 118 formed between an outer circumference 120 of shaft 84 and a bore 122 of stator 80. Upon exiting passage 118, the cooling fluid enters passage 125 positioned within a hub 126 of rotor 82. The cooling fluid exits passage 125 and travels along at least one passage 130 from which the cooling fluid is discharged into hydrodynamic chamber 86.

Cooling fluid 21 present in hydrodynamic chamber 86 travels along a generally toroidal path within hydrodynamic chamber 86, absorbing heat as the cooling fluid travels back and forth between the annular cavities 81 and 83 of stator 80 and rotor 82, respectively. Cooling fluid 21 present in hydrodynamic chamber 86 continues to travel along the path between rotor 82 and stator 80 until being discharged from hydrodynamic chamber 86. The heated cooling fluid 21 exits hydrodynamic chamber 86 through one or more passages 132. An exit 136 of passage 132 is in fluid communication with a circumferential annulus 138 formed in housing 78. Cooling fluid 21 exits passage 132 and travels along passageway 140 to exit port 62. Check valve 144 prevents cooling fluid 21 traveling along passage 140 from entering passage 115 at fluid junction 142.

Power for rotateably driving rotor 82 may be supplied by engine 22. An end 104 of drive shaft 84 extends from housing 78 of supplemental heating system 58. Fixedly attached to end 104 of shaft 84 for rotation therewith is a drive means 106. Drive means 106 preferably includes a sheave 108 engageable with an engine accessory drive belt 27a. Accessory drive belt 27a can engage sheave 25 attached to a crankshaft of engine 22. Drive belt 27a may also be used to deliver power required to operate water pump 24, as well as other engine accessories, such as an alternator and air conditioning compressor. Accessory drive belt 27a transfers torque generated by engine 22 to shaft 84 connected to rotor 82.

Drive means 106 preferably includes a clutch 109, such as an electromagnetic clutch, which can be selectively engaged depending on the heating requirements of heating system 46. Clutch 109 enables rotor 82 to be operably disengaged from engine 22 depending on the heating requirements of heating system 46. This is desirable to minimize the amount of power being drawn from engine 22, which may improve engine efficiency as well as free-up additional engine power for other purposes, such as accelerating the vehicle.

When the requirements of heating system 46 dictate that additional heat be added to the cooling fluid passing through heat exchanger 46, instead of bypassing heat generator 76, the cooling fluid entering supplemental heating system 58 at port 60 is directed to heat generator 76, where additional heat may be added to the cooling fluid. Additional heating of the cooling fluid is achieved by engaging clutch 109 to activate liquid heat generator 76. Cooling fluid entering supplemental heating system 58 through port 60 is directed along coolant supply passage 110 to junction 112. Rather than proceeding along passage 115, the cooling fluid instead travels along path 113 to liquid heat generator 76.

The heated cooling fluid 21 exits supplemental heating system 58 at port 62 and travels along path 54a to heater core 52, where heat from the cooling fluid is transferred to airstream 48, which may in turn be discharged to passenger compartment 50 of the vehicle.

Cooling fluid 21 exits heater core 52 and travels along path 56a to port 64, where the fluid reenters supplemental heating system 58. The cooling fluid travels along heat exchanger return passage 146 to valve 66. Depending on the particular heating requirements of heating system 46, valve 66 may direct the cooling fluid to either pathway 148, which returns the cooling fluid back to heat generator 76, or along path 150, which returns the cooling fluid to cooling system 20. Adjusting valve 66 so as to cause all of the cooling fluid to be returned to heat generator 76 through coolant recirculating passage 148, with none of the cooling fluid returning to cooling system 20 through coolant return passage 150, results in heating system 46 and cooling system 20 operating substantially independent of one another.

Cooling fluid 21 directed along path 150 by valve 66 exits supplemental heating system 58 at port 74. From there, the cooling fluid travels along path 56 to water pump 24 of engine cooling system 20.

Figure 3A:
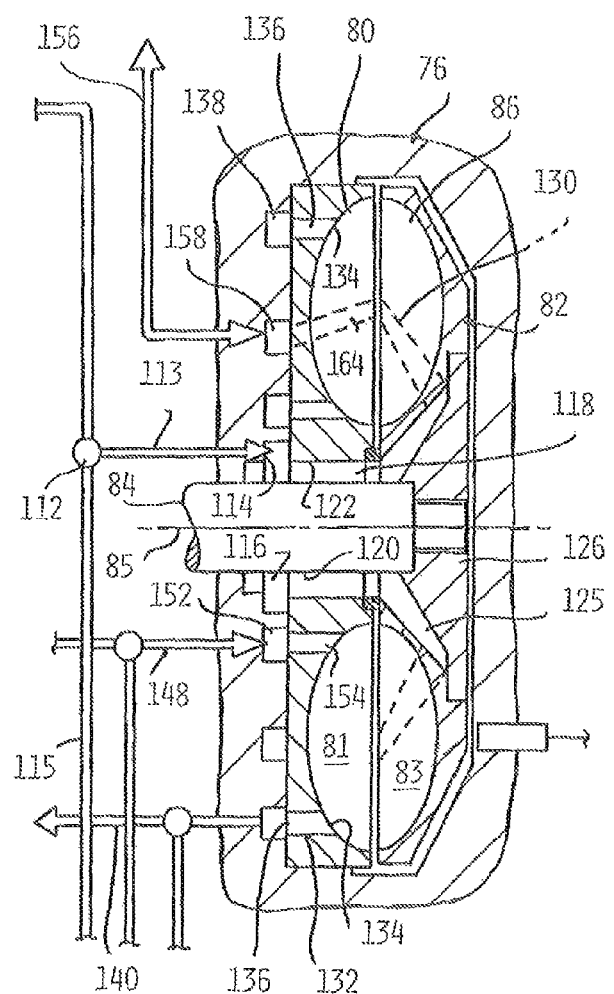
FIG. 3a is a fragmentary cross-sectional view of a liquid heat generator used in connection with the preferred embodiment supplemental heating system.

As shown in FIGS. 3 and 3a, hydrodynamic chamber 86 of heat generator 76 is vented to atmosphere through LHG vent passage 156. One end of LHG vent passage 156 is fluidly connected to an annular plenum 158 formed in housing 78, and an opposite end is connected to an exit port 160 positioned along an exterior surface of housing 78. A vent hose 162 fluidly connects LHG vent passage 156 to expansion tank 42. It is preferable that an air space 166 be continually present above cooling fluid 21 contained in expansion tank 42. Vent hose 162 may be attached to expansion tank 42 at a location adjacent to air space 166 so as to prevent vent hose 162 from being in direct communication with cooling fluid 21 contained in expansion tank 42. Stator 80 includes one or more vent passages 164 fluidly connecting plenum 158 to hydrodynamic chamber 86.

Control unit 68 functions to regulate the operation of heat generator 76 and valve 66. Control unit 68 is preferably a programmable microprocessor. Control unit 68 is operably connected to valve 66 through connector 168. Control unit 68 is capable of sending a control signal to valve 66 for controlling the operation of valve 66 for purposes of regulating the distribution of the cooling fluid between passages 150 and 148.

Control unit 68 may also function to control the operation of clutch 109, which is operably connected to control unit 68 by means of connector 170. Control unit 68 can be configured to send a control signal to clutch 109 directing the clutch to engage or disengage depending on the heating requirements of heating system 46. Engaging clutch 109 enables torque from engine 22 to be transferred to shaft 84 through drive belt 27a, which in turn causes rotor 82 to rotate about axis 85 and heat cooling fluid 21 present in hydrodynamic chamber 86. Disengaging clutch 109 disconnects shaft 84 and rotor 82 from engine 22. With clutch 109 disengaged, heat generator 76 ceases producing heat since shaft 84 and rotor 82 are no longer being rotateably driven by belt 27a.

Control unit 68 may be configured to monitor various operating parameters of supplemental heating system 58, such as a rotational speed of rotor 82, a temperature of cooling fluid 21 entering heat generator 76 through coolant recirculating passage 148, and a pressure of cooling fluid 21 exiting heat generator 76 through LHG discharge passage 140. The rotational speed of rotor 82 is monitored by means of a speed pickup 172, which may include any of variety of known speed pickup devices, such as an electromagnetic pickup. Using an electromagnetic pickup for speed pickup 172 entails suitably attaching a magnetized material to a back wall 173 of rotor 82. A sensor 175 is attached to housing 78 in a manner that enables sensor 175 to detect a magnetic field generated by the magnetized material attached to rotor 82. Connector 174 operably connects speed pickup 172 to control unit 68.

A temperature of cooling fluid 21 entering liquid heat generator 76 through coolant recirculating passage 148 may be monitored by means of a temperature probe 176, which may include any of a variety of known temperature sensing devices, such as a thermocouple, resistance temperature detector, and the like. Temperature probe 176 may be suitably positioned within coolant recirculating passage 148, or any other suitable location, to enable probe 176 to detect a temperature of cooling fluid 21 passing through the passage. A conventional connector 178 operably connects temperature probe 176 to control unit 68. Temperature probe 176 is capable of producing a signal that is indicative of a temperature of the cooling fluid present in the passage.

A fluid pressure of cooling fluid 21 exiting liquid heat generator 76 through passageway 132 may be monitored by means of a pressure probe 180, which may include any of a variety of known pressure sensing devices. Pressure probe 180 is preferably located within LHG discharge passage 140 near plenum 138, or any other suitable location, to enable pressure probe 180 to detect a pressure of cooling fluid 21 exiting liquid heating generator 76. Pressure probe 180 is capable of producing a signal that is indicative of a pressure of the cooling fluid passing through LHG discharge passage 140. A connector 182 operably connects pressure probe 180 to control unit 68.

Control unit 68 regulates the amount of heat generated by liquid heat generator 76. During operation, control unit 68 may continually monitor sensor signals being produced by various probes, including but not limited to temperature probe 176, pressure probe 180, and speed pickup 172. Control unit 68 may be suitably configured to automatically interpret each of the received signals to determine a temperature of the cooling fluid passing through coolant recirculating passage 148, a pressure of the cooling fluid passing through LHG discharge passage 140, and a rotational speed of rotor 82. Control unit 68 may be configured to automatically ascertain whether additional heat should be added to cooling fluid 21 based on the previously determined temperature, pressure, and rotational speed. If it is determined that cooling fluid 21 requires additional heating, control unit 68 operates to allow an electrical current to be applied to clutch 109 for engaging the clutch. With clutch 106 engaged, torque produced by engine 22 is transferred to shaft 84 of LHG 58, which causes rotor 82 to rotate and heat the cooling fluid contained in hydrodynamic chamber 86.

Supplemental heating system 58 is capable of operating in various modes depending on the heating requirement of heating system 46. In one mode, referred to as the bypass mode, liquid heat generator 76 is disengaged from engine 22 by deactivating clutch 109 and positioning control valve 66 in the bypass position. With control valve 66 positioned in the bypass position, cooling fluid 21 received by control valve 66 from heat exchanger return passage 146 is directed back to water pump 24 through coolant return passage 150.

To initiate operation of liquid heat generator 76, control device 68 can send a control signal to clutch 109 causing the clutch to engage and rotor 82 to begin rotating. Control valve 66 is preferably positioned in the bypass position when clutch 109 is first engaged. Cooling fluid 21 entering supplemental heating system 58 through port 60 flows along coolant supply passage 110 to fluid junction 112. Cooling fluid 21 travels through passage 113 to liquid heat generator 76. The cooling fluid follows the previously described path through liquid heat generator 76, exiting the liquid heat generator at port 136. Cooling fluid 21 travels along LHG discharge passage 140. Upon exiting supplemental heating system 58 at port 62, cooling fluid 21 travels along heater hose 54a to heat exchanger 52, whereupon exiting the heat exchanger, the cooling fluid is directed back to supplemental heating system 58 through heater hose 56a. Upon entering supplemental heating system 58 at port 64, cooling fluid 21 passes through heat exchanger return passage 146 to control valve 66. Since control valve 66 is positioned in the bypass position, all the cooling fluid entering the control valve is directed back to water pump 24 through coolant return passage 150. With coolant recirculating passage 148 closed, cooling fluid 21 is prevented from returning to liquid heat generator 76, thus causing an initial reduction in the quantity of cooling fluid present in hydrodynamic chamber 86. Air from expansion tank 42 is drawn into hydrodynamic chamber 86 through vent hose 162 and vent passage 156 in response to the reduction in the amount cooling fluid 21 present in hydrodynamic chamber 86.

Control valve 66 may also be operated in a recirculating mode. With clutch 109 engaged and liquid heat generator 76 operating, control device 68 can send a control signal to control valve 66 causing the valve to move from the bypass position to the recirculating position. With control valve 66 positioned in the recirculating position, cooling fluid 21 received from heat exchanger return passage 146 flows to recirculating passage 148 and from there to liquid heat generator 76. Cooling fluid is prevented from entering coolant return passage 150 while control valve 66 is operated in the recirculating mode.

Control valve 66 may also be operated in a modulation mode, wherein cooling fluid 21 can be selectively distributed between coolant return passage 150 and coolant recirculating passage 148 in order to help maintain a predetermined cooling fluid pressure level within LHG 76. Control device 68 continually monitors the fluid pressure of the cooling fluid in LHG 76, and is capable of varying the amount of cooling fluid that is returned to water pump 24 through coolant return passage 150 as a way of maintaining a desired pressure level within LHG 76. Generally speaking, increasing the amount of cooling fluid flowing to water pump 24 through coolant return passage 150 causes a corresponding decrease in the fluid pressure within LHG 76.

The amount of cooling fluid 21 entering coolant return passage 150 while operating in the modulation mode can be controlled using control valve 66. If it is determined that a decrease in cooling fluid pressure within LHG 76 is necessary, control device 68 can send a control signal to control valve 66 causing the valve to adjust the distribution of the cooling fluid between return passage 150 and recirculating passage 148. Cooling fluid 21 continues to flow to coolant recirculating passage 148 while operating in the modulation mode.

Figure 4:
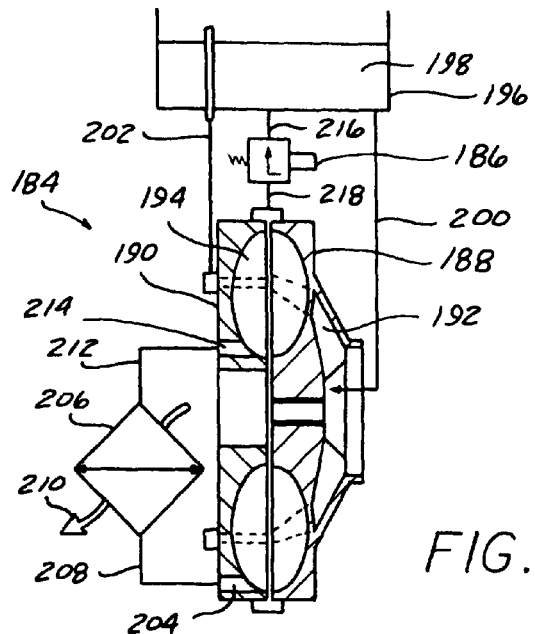
FIG. 4 is a cross-sectional view of an alternate embodiment supplemental heating system shown to include a proportional valve for regulating the amount of heat produced by the liquid heat generator.

FIG. 4 shows an alternate embodiment of an LHG 184 in which a proportional valve 186 is used to control a rate of heat generation of LHG 184. LHG 184 includes a rotor 188 and an opposing stator 190, both of which are essentially the same as previously described rotor 82 and stator 80, respectively. Rotor 188 includes a radial compressor 192 that functions as a pump for delivering a fluid to a hydrodynamic chamber 194.

LHG 184 further includes a fluid reservoir 196 for retaining a fluid 198. Reservoir 196 is fluidly connected to radial compressor 192 by means of fluid connector 200. In operation, compressor 192 functions to extract fluid 198 from reservoir 196 and deliver the fluid to hydrodynamic chamber 194 where it heated in the manner previously described with respect to LHG 58. The heated fluid 198 is discharged from hydrodynamic chamber 194 through a port 204 located in stator 190 near an outermost diameter of hydrodynamic chamber 194.

A heat exchanger 206, or another similar device, may be used to extract heat from fluid 198. Heat exchanger 206 is fluidly connected to passage 204 by means of a passage 208. Fluid 198 delivered to heat exchanger 206 passes through the heat exchanger where a portion of the fluid's heat is transferred to another medium 210, such as a fluid or gas. Fluid 198 exits heat exchanger 206 and is transported back to hydrodynamic chamber 194 through passage 212. Fluid 198 enters hydrodynamic chamber 194 through port 214.

Proportional valve 186 is fluidly connected to an outer circumference of hydrodynamic chamber 194 by means of passage 218. A passage 216 fluidly connects an exit of proportional valve 186 to reservoir 196. Proportional valve 186 is preferably infinitely adjustable between a fully closed position and a fully open position. Proportional valve 186 is operable to regulate the amount of heat generated in hydrodynamic chamber 194 by controlling the amount of fluid 198 circulating in hydrodynamic chamber 194. During operation the fluid pressure in hydrodynamic chamber 194 is higher than the fluid pressure in reservoir 196. The pressure difference will cause fluid to flow from hydrodynamic chamber 194 to reservoir 196 when proportional valve 186 is opened. The fluid flow rate may be varied by adjusting a thru-flow area of proportional valve 186. Increasing the fluid flow rate through proportional valve 186 decreases the volume of fluid present in hydrodynamic chamber 194, which in turn reduces the amount of heat being generated. In this way, the amount of heat being generated by LHG 184 may be controlled by adjusting the thru-flow area of proportional valve 186 to achieve a desired heating effect on fluid 198 present in hydrodynamic chamber 194. A maximum heating effect may be achieved when proportional valve 186 is fully closed to prevent fluid from being transferred from hydrodynamic chamber 194 back to reservoir 196. A minimum heating effect may be achieved with valve 186 fully open to maximize the rate of fluid transfer between hydrodynamic chamber 194 and reservoir 196. With valve 186 fully closed, hydrodynamic chamber 194 will become completely filled with fluid 198. Once hydrodynamic chamber 194 is completely filled, any excess fluid will be returned to reservoir 196 through passage 202 at a flow rate substantially equal to the flow rate of fluid passing through passage 200.

Figure 5:
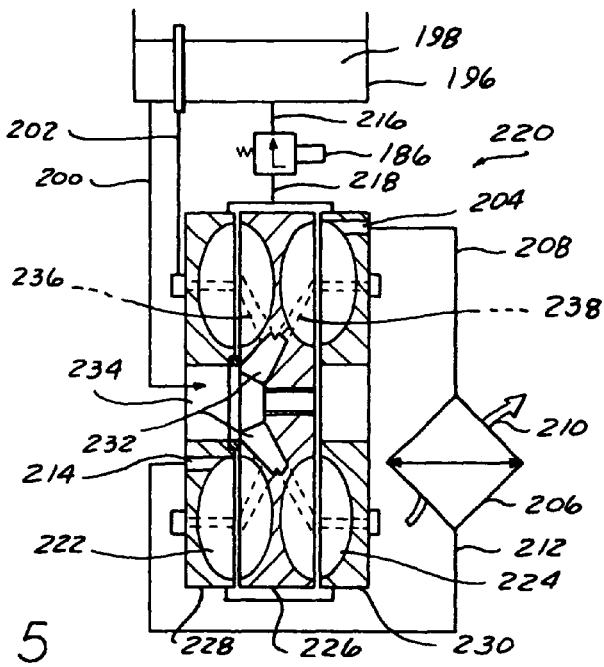
FIG. 5 is a cross-sectional view of the supplemental heating system shown in FIG. 4 modified to include dual hydrodynamic chambers.

FIG. 5 shows a LHG 220 similar to LHG 184 shown in FIG. 4, the primary difference being that LHG 220 incorporates two hydrodynamic chambers 222 and 224 rather than one. Doubling the number of hydrodynamic chambers increases the heat generating capacity of the LHG. LHG 220 includes a dual-sided rotor 226. A first side of rotor 226 forms one-half of hydrodynamic chamber 222 and an opposite side forms one-half of hydrodynamic chamber 224. A first stator 228 is juxtaposed the first side of rotor 226 to form the other half of hydrodynamic chamber 222. A second stator 230 is juxtaposed the second side of rotor 226 to form the other half of hydrodynamic chamber 224. Hydrodynamic chambers 222 and 224 may be configured substantially the same as hydrodynamic chamber 86 (see FIGS. 3 and 3a).

Rotor 226 includes a radial compressor 232 having an inlet 234 fluidly connected to reservoir 196 through passage 200. During operation compressor 232 functions as a pump to withdraw fluid from reservoir 196 and deliver the fluid to hydrodynamic chambers 222 and 224 through passages 236 and 238, respectively.

Proportional valve 186 may be operated in the same manner as previously described to regulate the flow rate of fluid 198 being transferred from hydrodynamic chambers 222 and 224 back to reservoir 196, with a maximum heating effect on the fluid occurring with valve 186 fully closed and a minimum heating effect occurring with the valve fully open. With valve 186 fully closed, both hydrodynamic chambers 222 and 224 will become completely filled with fluid 198. Once both cavities are completely filled, any excess fluid will be returned to reservoir 196 through passage 202 at a flow rate substantially equal to the flow rate of fluid passing through passage 200.

Figure 6:
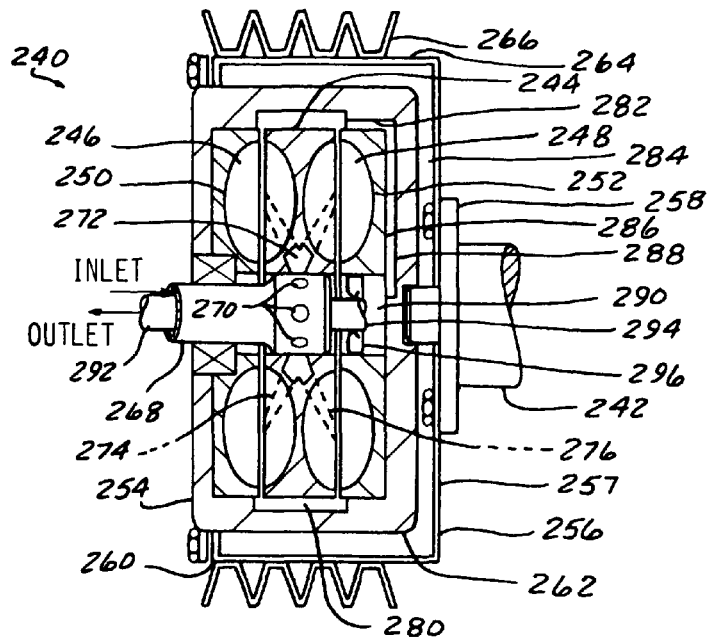
FIG. 6 is a cross-sectional view of a supplemental heating system shown in FIG. 7 modified to include dual hydrodynamic chambers.

Referring to FIG. 6, a heat generator 240 is shown attached directly to a crankshaft 242 of engine 22. Heat generator 240 may be used in place of heat generator 76 of supplemental heating system 58. Heat generator 240 may replace crankshaft pulley 25. Such a configuration may be advantageous for use in a vehicle with a particularly cramped engine compartment. Since heat generator 240 may be used in place of an already existing component (i.e., crankshaft pulley 25), heat generator 240 will generally not take up any additional space within the engine compartment.

Heat generator 240 is shown to include a dual-hydrodynamic chamber similar to that shown in FIG. 5. However, it shall also be appreciated that heat generator 240 may be suitably configured to include a single hydrodynamic chamber, such as shown in FIG. 4. Heat generator 240 includes a stator 244 having a first side forming one-half of a first hydrodynamic chamber 246, and a second side forming one-half of a second hydrodynamic chamber 248. A first rotor 250 is juxtaposed the first side of stator 244 to form the other half of first hydrodynamic chamber 246. A second rotor 252 is juxtaposed the second side of stator 244 to form the other half of the second hydrodynamic chamber 248.

Rotors 250 and 252 are fixedly attached to a housing 254 that substantially encloses both rotors. While operating LHG 240, housing 254, rotor 250, and rotor 252 rotate concurrently with respect to one another. A cup-shaped mounting bracket 256 may be used to attach housing 254 to crankshaft 242 for concurrent rotation therewith. An end portion 257 of the cup-shaped mounting bracket 256 may be suitably attached, such as by bolting, to a flange 258 formed on an end of crankshaft 242. A rim portion 260 of mounting bracket 256 may be suitably attached, such as by bolting, to an outer circumference 262 of housing 254. An outer circumference 264 of mounting bracket 256 may be suitably configured to include an engine accessory drive sheave 266. Sheave 266 operates in the same manner as accessory drive 25 shown in FIG. 1, and may be used to operably drive belt 27.

LHG 240 includes a supply line 268 suitably connected to cooling system 22. Cooling fluid 21 from engine cooling system 20 exits supply line 268 through one or more orifices 270 positioned around a circumference of supply line 268. The cooling fluid is discharged into an annular distribution plenum 272 formed in a bore of stator 244. One or more passages 274 fluidly connect plenum 272 to hydrodynamic chamber 246 and one or more passages 276 fluidly connect plenum 272 to hydrodynamic chamber 248. Cooling fluid passing through supply line 268 is divide substantially in half, with one-half passing through passages 274 to hydrodynamic chamber 246 and the other half passing through passages 276 to hydrodynamic chamber 248.

When operating LHG 240, cooling fluid present in hydrodynamic chambers 246 and 248 is heated in substantially the same manner as previously described. Heated cooling fluid 21 is discharged through one or more openings positioned along an outer circumference of hydrodynamic chambers 246 and 248 to an annular plenum 280 formed along an inner circumference 282 of housing 254. The fluid travels along a passageway 284 positioned between a back surface 286 of second rotor 252 an inside surface 288 of housing 254 and is discharged into a cavity 290 formed in the center of second rotor 252 and positioned along the second rotor's axis of rotation.

An outlet tube 292 for transporting the cooling fluid from heat generator 240 to heater core 52 is positioned within supply line 268, such that a longitudinal axis of supply line 268 substantially coincides with a longitudinal axis of outlet tube 292. An end 294 of outlet tube 292 extends into cavity 290. The cooling fluid present in cavity 290 enters end 294 of outlet tube 292 and is transported through outlet tube 292 to heater core 52. A seal 296 prevents the cooling fluid in cavity 290 from recirculating back to hydrodynamic chambers 246 and 248.

Figure 8:
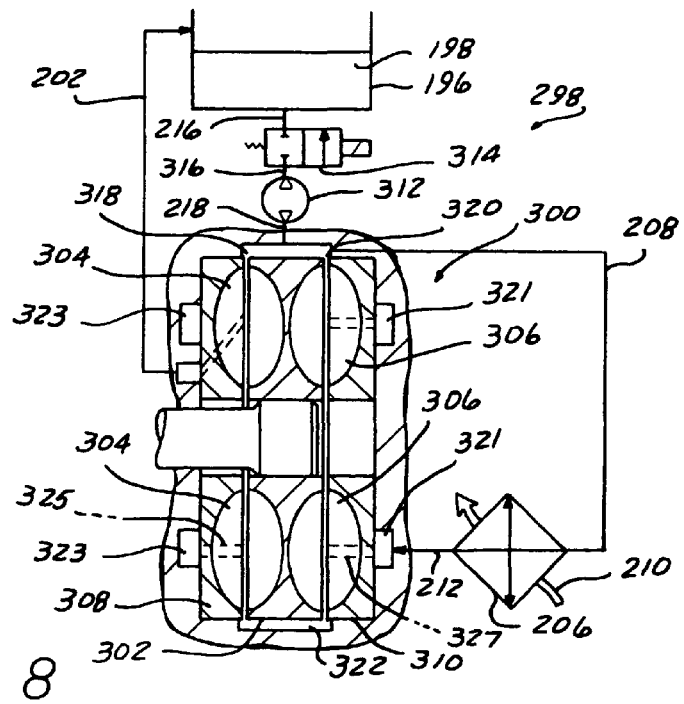
FIG. 8 is a cross-sectional view of a supplemental heating system incorporating a gear pump and solenoid valve for regulating the amount of heat produced by the liquid heat generator.
Figure 7:
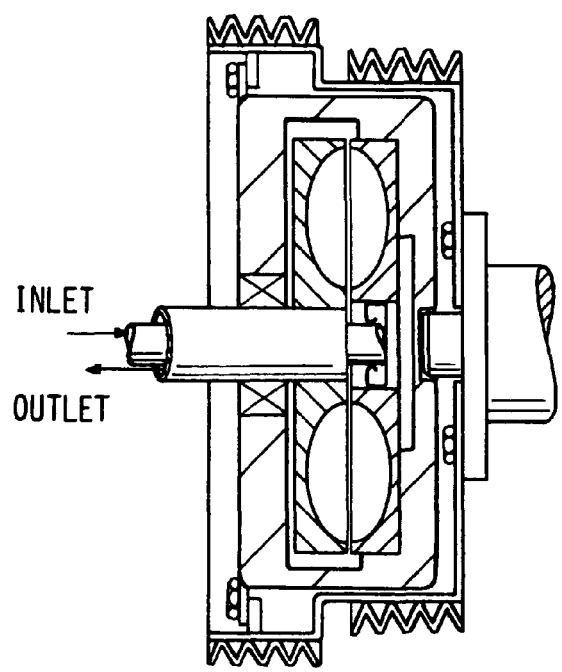
FIG. 7 is a cross-sectional view of the supplemental heating system adapted for attachment directly to a crankshaft of an engine.

Referring to FIG. 8, an LHG 298 is shown to include a dual-hydrodynamic chamber liquid heat generator 300 similar to that shown in FIG. 5. But unlike the heat generator shown in FIG. 5, liquid heat generator 300 does not have a radial compressor for supplying the hydrodynamic chambers with fluid.

LHG 298 includes a dual-sided rotor 302. A first side of rotor 302 forms one-half of hydrodynamic chamber 304 and an opposite side forms one-half of hydrodynamic chamber 306. A first stator 308 is juxtaposed the first side of rotor 302 to form the other half of hydrodynamic chamber 304. A second stator 310 is juxtaposed the second side of rotor 302 to form the other half of hydrodynamic chamber 306. Hydrodynamic chamber 304 and 306 may be configured substantially the same as hydrodynamic chamber 86 (see FIGS. 3 and 3a).

Because LHG 298 does not include a radial compressor, a reversible electric gear pump 312 may be used to operably regulate the amount of fluid 198 present in hydrodynamic chambers 304 and 306 at any given instance. Passage 218 fluidly connects gear pump 312 to an outer circumference of hydrodynamic chambers 304 and 306. To prevent possible discharge of fluid 198 through gear pump 312 when the gear pump is not activated, it may be desirable to incorporate a solenoid valve 314 into the fluid flow circuit connecting hydrodynamic chambers 304 and 306 to reservoir 196. One such arrangement is shown in FIG. 8, wherein solenoid valve 314 is positioned in the fluid circuit between gear pump 312 and reservoir 196. A passage 316 fluidly connects gear pump 312 to solenoid valve 314. Passage 216 fluidly connects solenoid valve 314 to reservoir 196.

It is generally preferable that solenoid valve 314 and gear pump 312 be activated simultaneously. There may be instances, however, where it is desirable to operate solenoid valve 314 independent of gear pump 312. For example, to make relatively fine adjustments in the amount of fluid present in hydrodynamic chambers 304 and 306, it may be beneficial to continuously operate gear pump 312 while selectively opening and closing solenoid valve 314 to control the transfer of fluid between hydrodynamic chambers 304 and 306.

In operation, gear pump 312 may be operated to transfer fluid 198 back and forth between hydrodynamic chambers 304 and 306 and reservoir 196 so as to achieve a desired volume of fluid in hydrodynamic chambers 304 and 306. Solenoid valve 314 will generally be open when gear motor 312 is operating, although as previously discussed, there may be instances where it is desirable to operate solenoid valve 314 independently of gear pump 312. Fluid 198 present in hydrodynamic chambers 304 and 306 is heated in substantially the same manner as previously described with respect to supplemental heating system 58. Heated fluid 198 is discharged from one or more openings 318 and 320 positioned along an outer circumference of hydrodynamic chambers 304 and 306, respectively, to an annular plenum 322 positioned long an outer circumference of stator 302. The heated fluid enters passage 208, which is fluidly connected to heat exchanger 206. As the heated fluid passes through heat exchanger 206, a portion of its heat is transferred to a second medium 210, which may be a gas or fluid. Upon exiting heat exchanger 206, the fluid is returned to heat generator 300 through passage 212. The fluid is discharged into a plenum 321 fluidly connected to hydrodynamic chamber 306. and a plenum 323 fluidly connected to hydrodynamic chamber 304. Plenum 321 is fluidly connected to plenum 323. The fluid reenters hydrodynamic chamber 304 through one or more passages 325 and hydrodynamic chamber 306 through one or more passages 327. Once hydrodynamic chambers 304 and 306 become completely filled, any excess fluid will be returned to reservoir 196 through passage 202 at a flow rate substantially equal to the flow rate of fluid passing through passage 218.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A heating apparatus connectable to an engine cooling system of a vehicle, the cooling system including a cooling fluid circulating within the cooling system and a heat exchanger for transferring heat from the fluid to an airstream for heating a passenger compartment of the vehicle, the heating apparatus comprising:

a hydrodynamic chamber operable to selectively heat the fluid present within an interior region of the hydrodynamic chamber when the heating apparatus is connected to the cooling system, the interior region including a first interior region and a second interior region, the hydrodynamic chamber having at least a first inlet port fluidly connected to a first interior region of the hydrodynamic chamber, and a second inlet port fluidly connected to a second interior region of the hydrodynamic chamber;

a recirculating passage fluidly connecting the heat exchanger to the first inlet port; and
a supply passage fluidly connecting the cooling system to the second inlet port.

2. The heating apparatus of claim 1 further comprising:
a stator;
a rotor coaxially aligned with and positioned adjacent the stator, the rotor operably rotatable relative to the stator, the rotor and stator at least partially defining the interior region of the hydrodynamic chamber;
a shaft attached to the rotor for concurrent rotation therewith; and
means for rotatably driving the shaft.

3. The heating apparatus of claim 2, wherein the drive means comprises a sheave operably connected to the shaft for co-rotation therewith, the sheave operably engageable with a crankshaft of an engine of the vehicle.

4. The heating apparatus of claim 3, wherein the drive means further comprises a clutch for selectively engaging the sheave with the shaft.

5. The heating apparatus of claim 4 further comprising a control device operably connected to the clutch for selectively controlling the operation of the clutch.

6. The heating apparatus of claim 2, wherein the drive means comprises an electric motor.

7. The heating apparatus of claim 2 further comprising:
a control device for controlling the operation of the heating apparatus; and
a rotational speed sensor operable to detect a rotational speed of the rotor, the speed sensor in operable communication with the control device and configured to send a signal to the control device indicative of the rotational speed of the rotor.

8. The heating apparatus of claim 1 further comprising a vent passage fluidly connected to the hydrodynamic chamber for venting the hydrodynamic chamber to atmosphere.

9. The heating apparatus of claim 1 further comprising a control valve having an inlet fluidly connected to a discharge port of the heat exchanger, a first exit port fluidly connected to the recirculating passage, and a second exit port fluidly connected to a return passage that is fluidly connectable to the engine cooling system, wherein the control valve is operable to selectively apportion fluid received from the heat exchanger between the return passage and the recirculating passage.

10. The heating apparatus of claim 9, wherein the control valve is selectively adjustable to direct substantially all of the fluid received from the heat exchanger to the return passage when the hydrodynamic chamber is not operating.

11. The heating apparatus of claim 9 further comprising a control device in operable communication with the control valve, the control device configured to send a control signal to the control valve for controlling the distribution of the fluid between the return passage and the recirculating passage.

12. The heating apparatus of claim 9, wherein the control valve is operable to cause a predetermined quantity of the fluid received from the heat exchanger to be directed through the recirculating passage to the hydrodynamic chamber when operating the hydrodynamic chamber.

13. The heating apparatus of claim 1 further comprising:
a control device for controlling the operation of the heating apparatus; and
a temperature sensor in fluid contact with the fluid present in the recirculating passage, the temperature sensor in operable communication with the control device and configured to send a signal to the control device indicative of the temperature of the fluid.

14. The heating apparatus of claim 1 further comprising:
an engine pulley attachable to a crankshaft of an engine for concurrent rotation therewith; and
a housing attached to the engine pulley for concurrent rotation therewith.

15. The apparatus of claim 14, wherein the housing is at least partially disposed within an interior space defined by an outer extremity of the pulley.

16. The apparatus of claim 14, wherein the housing is entirely disposed within an interior space defined by an outer extremity of the pulley.

17. The apparatus of claim 14, wherein the liquid heat generator further comprises a stator and a rotor positioned adjacent a first side of the stator, the rotor attached to the housing for concurrent rotation therewith.

18. The apparatus of claim 17, wherein the liquid heat generator further comprises a second rotor positioned adjacent a second side of the stator, the second rotor attached to the housing for concurrent rotation therewith.

19. The apparatus of claim 18, wherein the stator and the first rotor define a first cavity and the stator and the second rotor define a second cavity, the first cavity fluidly connected to the second cavity.

20. The heating apparatus of claim 1 further comprising a discharge passage for fluidly connecting the hydrodynamic chamber to the heat exchanger.

21. The heating apparatus of claim 20 further comprising a bypass passage fluidly connecting the supply passage to the discharge passage.

22. The heating apparatus of claim 21, wherein the bypass passage comprises a check valve operable to substantially prevent fluid from traveling from the discharge passage to the supply passage.

23. The heating apparatus of claim 21, wherein substantially the entire quantity of the fluid passing through the supply passage passes through the hydrodynamic chamber when the heating apparatus is connected to the cooling system and the hydrodynamic chamber is operating.

24. The heating apparatus of claim 21, wherein at least a portion of the fluid entering the heating apparatus through the supply passage passes through the bypass passage when the hydrodynamic chamber is not operating.

25. The heating apparatus of claim 20 further comprising:
a control device for controlling the operation of the heating apparatus; and
a pressure sensor in fluid contact with the fluid present in the discharge passage, the pressure sensor in operable communication with the control device and configured to send a signal to the control device indicative of the pressure of the cooling fluid.

26. The heating apparatus of claim 1 further comprising a return passage for fluidly connecting the recirculating passage to the engine cooling system, wherein fluid passing through the return passage is transferred to the engine cooling system.

27. A heating system for providing heat to a passenger compartment of a vehicle, the heating system comprising:
an engine;
an engine cooling system fluidly connected to the engine and including a fluid for cooling the engine;
a hydrodynamic chamber having at least a first inlet port fluidly connected to a first interior region of the hydrodynamic chamber and a second inlet port fluidly connected to a second interior region of the hydrodynamic chamber, the hydrodynamic chamber selectively operable for heating the fluid present within the hydrodynamic chamber;

a heat exchanger operable for transferring heat from the cooling fluid to an airstream deliverable to the passenger compartment;

a supply passage fluidly connecting the cooling system to the second inlet port of the hydrodynamic chamber; and a recirculating passage fluidly connecting the heat exchanger to the first inlet port of the hydrodynamic chamber.

28. The heating system of claim 27 further comprising:

a stator;

a rotor positioned adjacent the stator, the rotor being operably rotatable relative to the stator, the stator and rotor at least partially defining the first and second interior regions of the hydrodynamic chamber;

a shaft attached to the rotor for concurrent rotation therewith; and means for rotatably driving the shaft.

29. The heating system of claim 28, wherein the engine comprises a crankshaft operably connected to the drive means for concurrent rotation therewith, the drive means configured for selectable disengagement to enable the crankshaft to rotate independent of the shaft.

30. The heating system of claim 28 further comprising a control device operably connected to the drive means, wherein the drive means is operable in response to a signal received from the control device.

31. The heating system of claim 28 further comprising an expansion tank and a vent passage fluidly connecting the hydrodynamic chamber to the expansion tank.

32. The heating system of claim 28 further comprising:

a control device for controlling the operation of the liquid heat generator; and a rotational speed sensor operable to detect a rotational speed of the rotor, the speed sensor in operable communication with the control device and configured for sending a signal to the control device indicative of the rotational speed of the rotor.

33. The heating system of claim 27 further comprising a control valve having an inlet port fluidly connected to a discharge port of the heat exchanger, a first exit port fluidly connected to the recirculating passage, and a second exit port fluidly connected to the engine cooling system, wherein the control valve is operable for selectively distributing the cooling fluid received from the heat exchanger between the recirculating passage and the engine cooling system.

34. The heating system of claim 33 further comprising a water pump operable for circulating the fluid present within the engine cooling system, the water pump having an inlet fluidly connected to the second exit port of the control valve.

35. The heating system of claim 33 wherein the control valve is selectively adjustable to direct substantially all of the cooling fluid received from the heat exchanger to the engine cooling system.

36. The heating system of claim 33, wherein the control valve is selectively adjustable to direct substantially all of the cooling fluid received from the heat exchanger to the recirculating passage.

37. The heating system of claim 33 further comprising a control device in operable communication with the control valve, the control device configured for sending a control signal to the control valve for controlling the distribution of the cooling fluid between the engine cooling system and the recirculating passage.

38. The heating system of claim 27 further comprising a discharge passage fluidly connecting the hydrodynamic chamber to the heat exchanger and a bypass passage fluidly connecting the supply passage to the discharge passage.

39. The heating system of claim 38, wherein the bypass passage comprises a check valve operable to substantially prevent cooling fluid from flowing from the discharge passage to the supply passage.

40. The heating system of claim 38, wherein substantially all of the cooling fluid passing through the supply passage is discharged into the hydrodynamic chamber when the hydrodynamic chamber is operating.

41. The heating system of claim 38, wherein at least a portion of the cooling fluid passing through the supply passage also passes through the bypass passage when the hydrodynamic chamber is not operating.

42. The heating system of claim 27 further comprising:

a control device for controlling the operation of the liquid heat generator; and a temperature sensor in fluid contact with the cooling fluid present in the recirculating passage, the temperature sensor in operable communication with the control device and operable for sending a signal to the control device indicative of the temperature of the cooling fluid.

43. The heating system of claim 27 further comprising:

a control device for controlling the operation of the liquid heat generator;

a discharge passage fluidly connecting the hydrodynamic chamber to the heat exchanger; and a pressure sensor in fluid contact with the cooling fluid present in the discharge passage, the pressure sensor in operable communication with the control device and operable for sending a signal to the control device indicative of the pressure of the cooling fluid.

* * * * *